INVENTORS
GEORGE E. SMOCK &
RALPH M. STREAM
BY
*Staehli & Overmeyer*
ATTORNEYS

INVENTORS
GEORGE E. SMOCK &
BY RALPH M. STREAM

ATTORNEYS

United States Patent Office

3,213,728
Patented Oct. 26, 1965

3,213,728
SLITTER FOR MAT MATERIALS
George E. Smock and Ralph M. Stream, Newark, Ohio, assignors to Owens-Corning Fiberglas Corporation, a corporation of Delaware
Filed Sept. 6, 1962, Ser. No. 221,724
14 Claims. (Cl. 83—56)

This invention relates to a novel slitter, and more particularly to a freely rotatable, reciprocating slitter, particularly adapted to the lengthwise slitting or severing of mats made of randomly interlaced strands of continuous glass fibers.

In the production of fibrous mats, such as those made from randomly interlaced strands of continuous glass fibers, the mats are first formed, then coated with a binder, and thereafter passed through a heated oven to cure the binder and thereby retain the strands in coherent mat relation. Since the production operation is most effectively conducted by developing a mat of a width greater than can be used in actual applications, it is necessary to slit the mat longitudinally as it moves along the production line to convert it into appropriate widths for use. Also, as the mat passes through the curing oven there is some binder migration resulting in harsh edges on the pack, and edge trimming after cure is utilized to dispose of this harsh edge.

However, when it is realized that strands such as those made of continuous glass fibers are extremely tough, particularly when combined with a cured resinous binder, it will be understood that the slitting of mats made therefrom in a continuous and effective manner is a difficult operation. The slitters heretofore employed for this operation have been both of the powered or free-rolling disc type; however, they have not been found capable of providing satisfactory operation. Thus they have been subject to dulling, resulting in skipped cuts and product rejection. Also, the prior slitters have not been satisfactory for the production of a clean, sharp cut over extended periods of time.

Accordingly, it would provide a substantial advance in the art if a continuous slitter could be produced which would slit a constantly developed mat, particularly a mat made of randomly interlaced continuous glass fibers, without fouling or dulling; and that would positively and cleanly cut such mats without skips, tears or other defects, over extended periods of severe usage.

It is accordingly an important object of the present invention to provide a novel slitter for fibrous sheet materials.

It is a further object to provide a novel rotary slitter of the reciprocating type that is effective to cut mats of felted materials, such as strands of continuous glass fibers, containing a cured binder.

A further object is to provide a novel rotary slitter that reciprocates in timed relation with movement of a fibrous mat to provide a shearing action wherein the frequency of oscillation is related to linear movement of the mat, to provide effective and clean cutting of the mat over extended periods of time without dulling or other malfunction and without producing skips, tears or other defects in the mat materials.

A further object is to provide an improved slitter for continuously developed mat materials that is of unique and coherent design; that produces a simultaneous rotary and oscillating action with regard to a mat to provide clean and positive cutting over extended periods of time without producing defects in the mat and without dulling or becoming jammed even in the presence of cured binder materials.

A still further object is to provide a method for continuously slitting fibrous sheet materials.

Another object is to provide a method for slitting lineally moving fibrous sheets such as fibrous mats, utilizing an oscillating, arcuate cutting edge.

Other objects of this invention will appear in the following description and appended claims, reference being had to the accompanying drawings forming a part of this specification wherein like reference characters designate corresponding parts in the several views.

Before explaining the present invention in detail it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

PERSPECTIVE VIEW

Briefly, the present invention relates to a novel disc-type slitter, wherein the cutting disc is weighted to ride or float upon a fibrous mat or sheet material as the latter passes over a power-driven back-up roll. An important feature of the invention resides in the fact that the disc-like slitter is reciprocated in timed relationship to the lineal movement of the mat upon which it acts; and that the blade is freely rotatable on its cooperating back-up roll as distinguished from the prior art.

In fact, this slitter, as contrasted to the prior art devices, is the only unit known to exist which will satisfactorily perform on a mat comprised of randomly interfelted continuous glass strands, with a cured thermosetting resin binder thereon. This provides a very substantial advance in the art when it is understood that this material is very harsh and difficult to cut as regards the maintenance of a good clean cutting edge, due to the hardness of the fibers and the bonding resin which it must constantly penetrate. Also, the effectiveness of the present slitter is demonstrated by the fact that extremely clean cutting is provided as contrasted to prior art devices, the cutting being effected without skips, tears or other defects being imparted to the mat, over extended periods of operation, thus providing proof of the durability and effectiveness of the device of invention.

THE ENVIRONMENT

Figure 1:
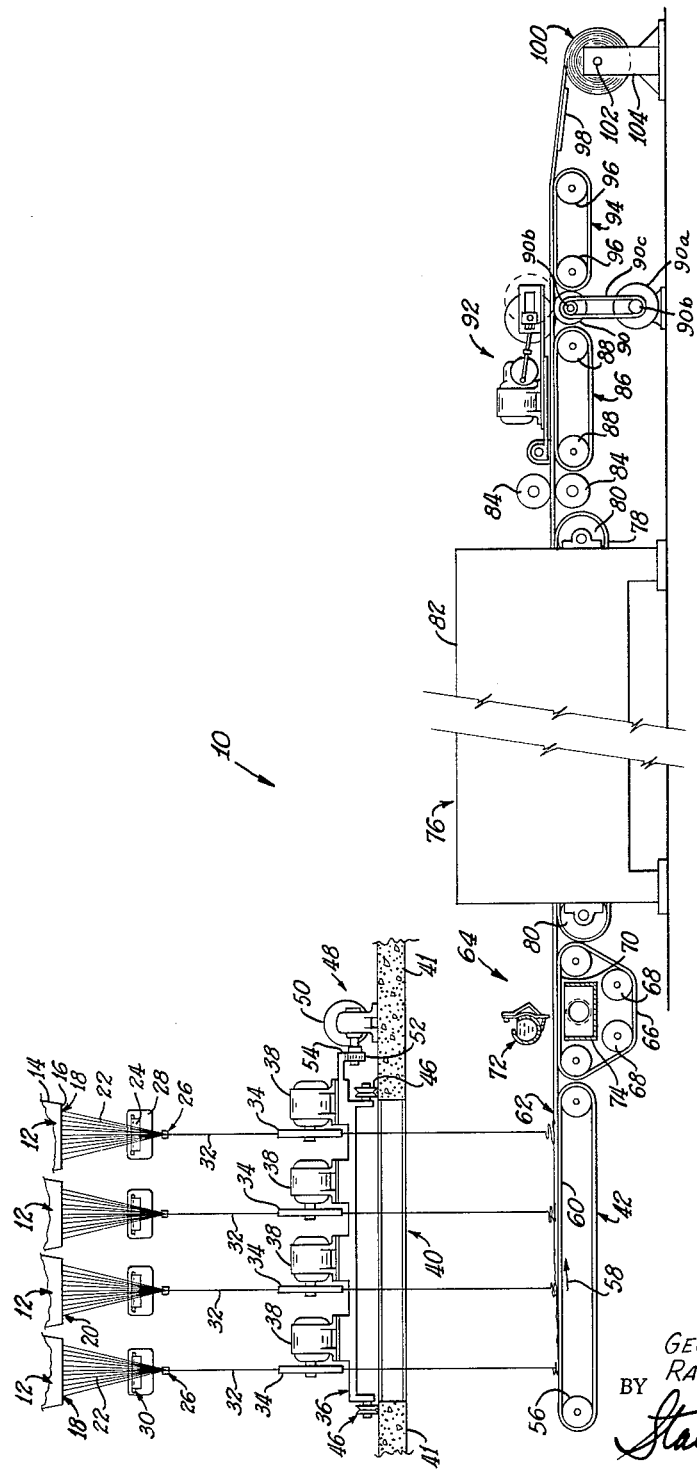
FIGURE 1 is a side elevational view of a continuous glass strand mat production line wherein the novel slitter of the present invention is adapted to be used.

As shown in FIGURE 1, there is illustrated a production line 10 for making mats from randomly interfelted continuous glass strands. The line 10 typically includes a plurality of continuous fiber producing bushings 12, having body portions 14, suitably made of an alloy of a precious metal such as platinum. Electric current is fed through the bushings 12 by means of terminals, not shown, to provide glass melting heat.

Atop each of the bushings 12 there is provided an opening through which glass forming materials such as glass marbles can be fed into the bushing for melting to form a body of molten glass.

The bottom 16 of each bushing 12 is provided with a plurality of aligned tips 18 through which the molten glass exudes as small molten streams 20, which when attenuated at a sufficiently rapid rate are converted into very fine continuous glass fibers 22. The fibers 22 issue downwardly in converging relation over a moving coating belt 24 to a wear resistant guide block, indicated at 26. As the fibers 22 converge downwardly they pass tangentially over the surface of the moving belt 24 that is kept wetted with a binder and size material. The belt 24 runs over a powered support roll positioned within a container 28 to which liquid size is added and maintained to an appropriate level. A guide rod, positioned at the point 30 forms the belt 24 into a reverse curve for the aforementioned tangential contact with the fibers 22. Formation of the strand 32 takes place at guide block 26.

The attenuating force for the formation of the fibers 22 from the previously mentioned streams 20 is provided by pairs of contra-rotating pull rolls 34, carried upon shafts of synchronized motors 38. The motors 38 are mounted upon a reciprocable carriage 36.

As will be noted, the continuous strands 32 issuing from pull rolls 34 are directed downwardly through an opening 40 in a support floor 41 onto an endless foraminous screen or collecting chain 42. To distribute the strands 32 across the collecting chain 42, the carriage 36 upon which the rotatable pull rolls 34 and their driving motors 38 are mounted, is adapted to be reciprocated on rollers 46 or equivalent, by a suitable reciprocating mechanism indicated at 48. The reciprocator 48 can take a variety of forms; however, one suitable arrangement comprises a reversible gear motor 50 having a drive gear 52 engaged with a toothed rack 54 provided along one edge of the carriage 36.

As previously mentioned, the collection chain 42 is of endless configuration, being supported at its ends by rotatable rolls 56, one or more of which is adapted to be powered to move the chain in the arrow 58 direction as indicated in FIGURE 1. At the right end of the upper flight 60 of the chain 42, a full thickness mat is provided as indicated by the numeral 62 and the mat moves to a binder applicator section 64 which includes an endless chain 66 carried upon rotatable rolls 68. As the mat 62 moves along the upper flight 70 of chain 66 it passes beneath a liquid binder applicator 72, forming the subject of co-pending application Serial No. 221,734, filed September 6, 1962, also assigned to the same assignee, which is effective to uniformly distribute a coating of liquid binder throughout the mat. Positioned beneath the upper flight 70 of chain 66, there is provided a binder extractor 74 in the form of a suction box to pull excess binder on through the mat 62 and flight 70 of chain 66 to provide a regulated retention in the mat.

From the binder application section 64 the mat 62 passes to a curing section 76, including a third endless chain 78 supported on spaced rolls 80. The chain 78 extends through an oven 82. As the mat 62 emerges from the oven 82, it leaves the end of the chain 78 and passes between a pair of compaction rolls 84 for thickness control. From the compaction rolls 84, the mat 62 passes to a first run-out chain 86 carried by rolls 88, and then over a back-up roll 90 with which the slitter 92 of invention cooperates to slit the mat into desirable widths, as well as to trim off brash or harsh edges where desired. From the back-up roll 90 and slitter 92 the mat 62 passes to a second run-out chain 94, carried by rolls 96, and thence over an inspection table 98 to be rolled into packages 100, rotatably supported upon a mandrel 102 carried by a support 104.

It was mentioned above in Perspective View that the back up roll 90 is powered. For this purpose, a gear motor 90a can be provided beneath the roll 90. The shaft of the motor 90a carries a sprocket 90b and the shaft mounting the back up roll 90 also carries a similar sprocket 90b. A chain 90c laps the sprockets 90b in driving relation. By so operating, the periphery of roll 90 is suitably driven at production line speed.

It is upon this environmental background that the slitter 92 of the present invention is superimposed and a complete description now follows.

THE INVENTION

Pivotal mounting of slitter

Figure 2:
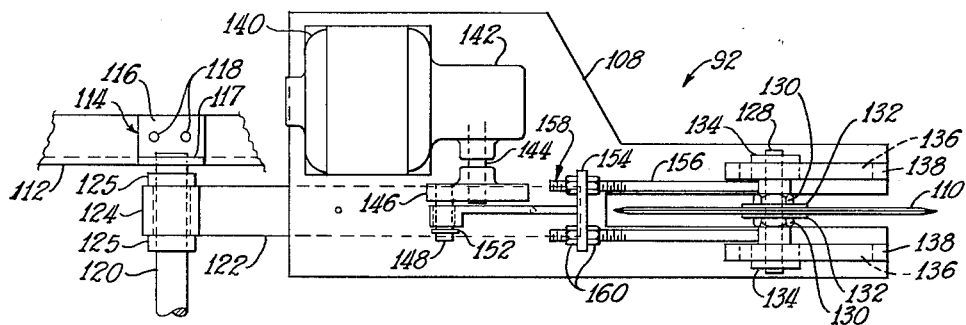
FIGURE 2 is a plan view of the novel slitter of the present invention.
Figure 3:
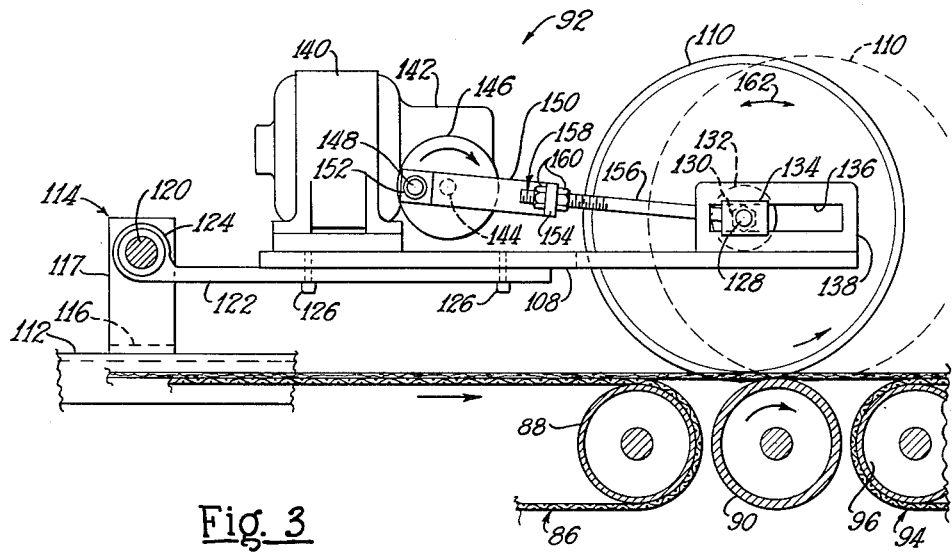
FIGURE 3 is a side elevation view of the present slitter.

As better shown in FIGURES 2 and 3, the slitter 92 is mounted upon a platform 108, of generally elongated and flattened configuration. It is an important aspect of the invention that the slitter 92 is mounted for pivotal movement so that the cutter 110 thereof can ride over the back-up roll 90 and whereby the periphery thereof can be in constant riding contact with the back-up roll. To provide such pivotal movement, a frame member 112 along side the machine has an L-shaped bracket 114 secured thereto, as by riveting or bolting through the leg portion 116 as at 118. A similar L-shaped bracket 114 is provided on the other side of the machine and the vertically disposed arms 117 of the brackets 114 support a transverse shaft 120 which extends over the belt 86. By so operating, the transverse shaft 120 is of substantial length to support one or more slitter units 92, across the width of the mat 62 to provide for cutting of the mat into a plurality of strips of desirable width.

As shown in FIGURE 3, a pivoted support arm 122 has one end thereof formed as a journal or bearing 124 adapted to fit upon the shaft 120 in free rotatable relation, thrust rings 125 being secured to the shaft on each side for placement. The median portion and the other end of the pivot support arm 122 are positioned beneath the platform 108 and secured as by bolting at 126. Thus, the platform 108 carrying the cutter 110 of the slitter 92 is adapted to pivot about the shaft 120 whereby the cutter can ride in floating relation over the top peripheral portion of the back-up roll 90.

It will be noted that the slitter knife 110 is of disc configuration, being provided with a coaxial mounting hole at the center thereof through which a support shaft 128 can be passed. The support shaft 128, at points adjacent each side of the disc 110, is threaded, and bolts 130 are placed thereon to draw enlarged support washers 132 against each side of the disc 110 to provide perpendicularly aligned relationship of the disc on the support shaft 128. The outer ends of the support shaft 128 are journaled in slidable blocks 134, having their upper and lower surfaces channeled to ride within a slot 136, formed in vertically disposed guide plates 138 that are positioned in parallel alignment on the right end and top of the support platform 108. Although not shown, the guide plates 138 are fastened as by welding or bolting.

Slitter reciprocation

To provide controlled and regulated reciprocation of the cutter or slitter knife 110, a drive motor 140, having a built in reduction gear set in the housing 142 is provided on the left end of the platform 108. Included in the reduction gear housing 142 is a right angle output shaft 144 carrying on its exposed end a drive wheel 146 locked onto the shaft as by a key or other suitable connecting device. Eccentrically mounted adjacent the periphery of the drive wheel 146, is a connecting pin 148 and one end of a link arm 150 is rotatably journaled thereon, being retained by a snap ring 152. The right hand end of the link arm 150 terminates in a T form, including a perpendicularly disposed connection plate 154. At their forward ends, connection rods 156 are journaled on the support shaft 128 and are threaded at their rear ends 158, the threaded rear ends being passed respectively through spaced apertures in the perpendicular connection plate 154. To provide suitable adjustment and a locking connection, bolts 160 are applied to the threaded rear ends 158 on each side of the connection plate 154.

From the foregoing, it will be understood that when the motor 140 is actuated, a reciprocating motion will be applied to the link arm 150 that is effective to move the cutter wheel 110 in an arcuate reciprocating direction indicated by the arrow 162 as it rolls freely over the top peripheral portion of the back-up roll 90.

Exemplary operation of the invention

The slitter of invention was used to slit a mat made of randomly interfelted strands of continuous glass fibers, the strands being bonded together by a heat-curable binder and having a thickness on the order of about 5 to 10 thousandths inch. The mat was formed at a line speed of about 12 feet per minute. The ratio motor 140 driving a cutter disc of 10 inch diameter provided a reciprocation of 172.5 strokes per minute, the stroke being approximately 2 inches. At a reciprocation of 172.5 times per minute, the slitter blade center thus traveled a distance of 345 inches per minute in each direction. Thus, at a conveyor speed of 12 feet per minute the slitter blade would pass over any given point of the mat 4.8 times in 2.4 cycles of reciprocation. Thus, a reciprocation speed of 29 feet per minute while the mat was traveling 12 feet per minute was provided.

Extended scope of invention

In the broad range of operation, it will be considered within the scope of the invention to operate the slitter at a reciprocation rate to provide a speed in the range of about 1.5 times the speed of the mat line to a speed of about 3 times the speed of the mat line. Thus, the slitter blade may pass over any given point of the mat from about 2 to 5 times during passage of the mat beneath the slitter. Preferably, a reciprocation speed of approximately twice the mat line speed will be utilized to provide blade contact of 4 times with a given point on the mat.

The broad scope of the invention would also include operation of the mat line at a speed in the range of about 2 to about 40 feet per minute. When so operating, the ratio motor is adjusted to provide an output to give a reciprocation travel in the foregoing ranges.

It will be noted from the foregoing that the slitter is positioned horizontally and the blade biased downwardly against the back-up roll by the weight of the mounting structure and ratio motor. Also, it will be noted that the bias of the cutting edge against the back-up roll may be adjusted by adjustment of the ratio motor along the supporting platform and thus moving its weight toward or away from the cutter to change the respective lever arm distance between the pivot shaft 120 and the contact point of the cutter with the mat. However, the invention is not to be limited to horizontal disposition of the slitter; thus it may be positioned vertically and biased into engagement with the back-up roll 90 as by means of springs or other appropriate devices. Still further, the slitter and back-up roll could be reversed and the slitter thus operate from beneath the mat, suitable bias being provided.

For operation in accordance with the present invention, the bias of the slitter disc 110 against the back-up roll 90 is adjusted to the particular mat material being slit. Thus, the invention is not to be limited to any particular strength of bias of the cutter disc 110 against the mat material, although each mat material will no doubt display a most effective biasing range.

Also, it would be considered within the broad scope of invention to move the slitter relative to the mat utilizing the novel reciprocating action, and positioning the mat on an elongated planar back-up surface.

While the foregoing description has illustrated the novel slitter of the present invention as operating upon bonded mat, it is to be included within the scope of the invention to operate the slitter upon an unbonded mat; this would include placement in front of the binder applicator section 64, in FIGURE 1, as for providing edge trim before the mat enters the oven, to thereby accommodate the mat width to the maximum oven width.

While the invention has been particularly described with respect to the slitting of a mat made of strands of continuous glass fibers with mat thickness up to about 10 thousandths inch, other materials and thicknesses may be cut using appropriate adjustments. Thus mats made from staple fibers of both inorganic and organic origin may be cut.

Advantages of the present invention

From the foregoing, it will be observed that a novel slitter for inorganic fibrous mats has been provided by the present invention. The novel slitter of the present invention is characterized by an improved cutting action over extended periods of time, providing clean slitting without skips, tears or the like in the mat, and providing positive slitting over extended periods of use, operating on fibrous glass mats that have proved difficult to slit into commercially acceptable products by the slitters of the prior art.

We claim:

1. In a method of slitting a flexible sheet material, the steps of positioning the sheet material against a curved back-up surface, biasing an arcuate cutting edge against the sheet material and toward said back-up surface, and reciprocating said arcuate cutting edge and said curved back-up surface arcuately relative to one another to move said arcuate cutting edge into peripheral contact with said curved back-up surface and through said material.

2. In a method of slitting a sheet material, the steps of positioning sheet material between a back-up surface and an arcuate cutting edge, and arcuately reciprocating the arcuate cutting edge relative to the sheet material and the back-up surface while biasing the cutting edge through the material and into contact with the back-up surface.

3. In a method of slitting a fibrous sheet material, the steps of moving the sheet material over an arcuate back-up surface, biasing a freely rotatable arcuate cutting edge toward said back-up surface and through said sheet material, and simultaneously reciprocating said cutting edge relative to said sheet material at a lineal speed sufficient to provide passage of said cutting edge over an individual point of said material from about 2 to 5 times.

4. In a method of slitting a fibrous sheet material, the steps of feeding the fibrous sheet material between an arcuate back-up surface and an arcuate cutting edge biased into peripheral engagement with one another and rotatable in common directions, and simultaneously reciprocating said arcuate cutting edge relative to said arcuate back-up surface to move said edge through said material and into peripheral engagement with said back-up surface.

5. In a method of slitting a sheet material, the steps of positioning one surface of the sheet material against an arcuate back-up surface, biasing an arcuate cutting edge against the other surface of said sheet material, and arcuately reciprocating said biased arcuate cutting edge relative to said sheet material and said back-up surface.

6. In a method of slitting a fibrous sheet material, the steps of positioning one surface of the sheet material against a back-up surface, biasing a freely movable arcuate cutting edge against the other surface of said sheet material while moving the material along relative to said cutting edge and back-up surface, and simultaneously reciprocating said cutting edge relative to said sheet material.

7. In a method of slitting a fibrous sheet material, the steps of moving one surface of the sheet material against an arcuate back-up surface at a rate in the range of 2 to 40 feet per minute, biasing a freely rotatable arcuate cutting edge against the other surface of said moving sheet material, and simultaneously reciprocating said cutting edge relative to said sheet material at a rate in the range of 3 to 120 feet per minute.

8. In a method of slitting a fibrous sheet material, the steps of moving one surface of the sheet material against an arcuate back-up surface, biasing a freely rotatable arcuate cutting edge against the other surface of said moving sheet material, and simultaneously reciprocating said cutting edge relative to said sheet material at a lineal speed to provide passage of said cutting edge over an individual point of said material a plurality of times.

9. In a method of slitting fibrous sheet materials, the steps of
moving a sheet material in a lineal direction,
biasing an arcuate cutting edge into penetrating contact with the material,
and reciprocating said cutting edge and said material relative to one another during said lineal direction of movement.

10. In a slitter for sheet materials, a back-up roll adapted to have a sheet material to be slit passed in tangential contact with the periphery thereof, means for rotating said back-up roll in the direction of movement of said sheet material thereover, a support mounted for pivotal movement with respect to said back-up roll, an arcuate slitter blade rotatably journaled on said support, said slitter blade being positioned in parallel axial alignment and peripheral contact with said back-up roll, means biasing said slitter blade into peripheral contact with said back-up roll, and means for reciprocating said slitter with respect to said back-up roll whereby said slitter axis moves in a reversing arc.

11. In a slitter for flexible sheet materials, a back-up roll adapted to have a material to be slit passed in contact with the periphery thereof, means for rotating said back-up roll in a direction common to movement of the material thereover, a disc-like slitter blade journaled for free rotation and having its periphery positioned in engageable relationship with the periphery of said back-up roll, said slitter blade being positioned in parallel axial alignment and being mounted for floating peripheral engagement against the periphery of said back-up roll, and means for reciprocating said slitter, whereby said slitter axis assumes an arc of travel as the periphery thereof moves over the periphery of said back-up roll.

12. In a slitter for flexible sheet materials, a back-up roll journaled for rotation and adapted to have a fibrous material to be slit passed in contact with the periphery thereof, means for rotating said back-up roll in a direction common to movement of said material thereover, a disc-like slitter blade journaled for rotation and having its periphery sharpened to an endless cutting edge, said blade being positioned in parallel axial alignment for peripheral contact with said back-up roll and being mounted for floating peripheral engagement against the periphery of said back-up roll, means biasing said blade toward said back-up roll, and means for reciprocating said slitter.

13. In a slitter for fibrous sheet materials,
first support means,
a blade having an arcuate periphery with a knife-like cutting edge, and mounted on said support to engage fibrous sheet material moved lineally relative to the periphery of the blade,
means biasing said blade into engagement with and through said sheet material,
means for reciprocating said blade relative to said material,
and means for moving said material lineally relative to said blade during said reciprocation.

14. In a slitter for flexible sheet materials,
an elongated support,
means mounting said support at one end for pivotal movement,
a support surface,
a circular slitter blade having a continuous knife-like periphery opposite said support surface and freely rotatably journaled on said support to engage the sheet material moved lineally over said support surface,
means biasing said periphery through said sheet material and toward said support surface,
and means for reciprocating said slitter lineally parallel to said sheet material as the sheet material and slitter are moved relative to one another.

References Cited by the Examiner

UNITED STATES PATENTS

| | | | |
|---|---|---|---|
| 291,116 | 1/84 | West | 83—433 |
| 320,650 | 6/85 | Goettler | 83—433 |
| 1,448,723 | 3/23 | Brundage | 83—257 |
| 1,455,232 | 5/23 | Speer | 83—37 |
| 1,895,852 | 1/33 | Johnstone | 83—506 |
| 1,944,781 | 1/34 | Cameron | 83—506 |
| 2,101,753 | 12/37 | Rambold | 83—37 |
| 2,390,426 | 12/45 | Davidson | 83—346 |
| 3,130,621 | 4/64 | Else | 83—647.5 |

ANDREW R. JUHASZ, *Primary Examiner.*

HUNTER C. BOURNE, JR., *Examiner.*